(12) United States Patent
Ozeki (10) Patent No.: US 12,091,995 B2
(45) Date of Patent: Sep. 17, 2024

(54) INSTALLATION STRUCTURE FOR OIL CONTROL VALVE

(71) Applicant: SUZUKI MOTOR CORPORATION, Hamamatsu (JP)

(72) Inventor: Hisashi Ozeki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/336,654

(22) Filed: Jun. 16, 2023

(65) Prior Publication Data

US 2023/0417161 A1    Dec. 28, 2023

(30) Foreign Application Priority Data

Jun. 24, 2022   (JP) ................. 2022-101977

(51) Int. Cl.
*F01L 1/344*    (2006.01)
*B62J 41/00*    (2020.01)
*F01N 3/30*     (2006.01)

(52) U.S. Cl.
CPC ............ *F01L 1/3442* (2013.01); *B62J 41/00* (2020.02); *F01L 2001/34423* (2013.01); *F01L 2001/3443* (2013.01); *F01L 2001/34433* (2013.01); *F01L 2810/01* (2013.01); *F01N 3/30* (2013.01)

(58) Field of Classification Search
CPC ..................... B62J 41/00; F01L 1/3442; F01L 2001/34423; F01L 2001/3443; F01L 2001/34433; F01L 2810/01; F01N 3/30
USPC ...................................................... 123/90.15
See application file for complete search history.

(56) References Cited

U.S. PATENT DOCUMENTS

| 6,220,020 | B1 * | 4/2001 | Takahashi ................ F01N 3/30 60/293 |
| 6,234,124 | B1 * | 5/2001 | Tsukui .................... F02B 61/02 123/308 |
| 8,479,702 | B2 | 7/2013 | Adachi et al. ................ 123/196 |

(Continued)

FOREIGN PATENT DOCUMENTS

| DE | 202008013310 U1 * | 3/2009 | ............... F01L 1/34 |
| EP | 2 634 386 B1 | 2/2013 | |

(Continued)

OTHER PUBLICATIONS

DE-20-2008-013-310-U1.*

(Continued)

*Primary Examiner* — Jorge L Leon, Jr.
(74) *Attorney, Agent, or Firm* — Stein IP, LLC (57) ABSTRACT

There is provided an installation structure for an oil control valve configured to control a hydraulic pressure to a variable valve device, in an engine in which a cylinder head cover is provided on a cylinder head, and the variable valve device that is configured to change an opening and closing timing of a valve by a hydraulic pressure is mounted. The installation structure includes: a first slope that slopes upward and rearward from a front end on an upper surface of the cylinder head cover; and a second slope that slopes downward and rearward from a rear end of the first slope on the upper surface of the cylinder head cover. A radiator is installed in front of the cylinder head cover, and the oil control valve is installed on the second slope.

8 Claims, 7 Drawing Sheets

(56) References Cited

U.S. PATENT DOCUMENTS

| | | | | |
|---|---|---|---|---|
| 2004/0025819 | A1* | 2/2004 | Itou | F01M 1/16 |
| | | | | 123/90.16 |
| 2004/0216791 | A1* | 11/2004 | Inui | F01L 3/205 |
| | | | | 137/856 |
| 2006/0027199 | A1* | 2/2006 | Yoshijima | F02F 7/006 |
| | | | | 123/90.34 |
| 2009/0235892 | A1* | 9/2009 | Sumiya | F02F 7/006 |
| | | | | 123/195 C |
| 2011/0233447 | A1* | 9/2011 | Anno | F01M 1/16 |
| | | | | 251/366 |
| 2018/0313237 | A1 | 11/2018 | Ozeki | |
| 2018/0313263 | A1* | 11/2018 | Ozeki | F02B 61/02 |
| 2022/0315154 | A1* | 10/2022 | Hirano | B62K 11/04 |

FOREIGN PATENT DOCUMENTS

| | | | |
|---|---|---|---|
| JP | 6853838 B2 | 3/2021 | |
| WO | WO-2006085640 A1 * | 8/2006 | F01L 1/053 |

OTHER PUBLICATIONS

Extended European Search Report dated Nov. 16, 2023, issued by the European Patent Office in corresponding application EP 23179481.9.

\* cited by examiner

INSTALLATION STRUCTURE FOR OIL CONTROL VALVE

CROSS-REFERENCE TO RELATED APPLICATIONS

This application is based upon and claims the benefit of priority from prior Japanese patent application No. 2022-101977, filed on Jun. 24, 2022, the entire contents of which are incorporated herein by reference.

TECHNICAL FIELD

The present invention relates to an installation structure for an oil control valve.

BACKGROUND ART

For the purpose of high output, low fuel consumption, and decreased exhaust gas, a variable valve timing system is employed, which controls an opening and closing timing of a valve by a variable valve device according to an operating state of an engine. As the variable valve timing system, there is a system in which an oil control valve installed on an outer surface of a cylinder head controls a hydraulic pressure to the variable valve device (see, for example, Patent Literature 1). Oil controlled by the oil control valve is supplied to the variable valve device, and the variable valve device switches between a cam for low speed rotation and a cam for high speed rotation to adjust the opening and closing timing of the valve.

Patent Literature 1: JP6853838B

However, the oil control valve described in Patent Literature 1 is attached to a front surface of the cylinder head, and is exposed to exhaust air from a radiator in front of the cylinder head. In addition, an exhaust pipe is positioned below the oil control valve, and the oil control valve is also exposed to hot air from the exhaust pipe. Therefore, there is a problem that operation characteristics of the oil control valve are changed, and operation accuracy and durability are lowered.

The present invention is made in view of the above problem, and an object of the present invention is to provide an installation structure for an oil control valve capable of suppressing heat damage to an oil control valve.

SUMMARY OF INVENTION

There is provided an installation structure for an oil control valve configured to control a hydraulic pressure to a variable valve device, in an engine in which a cylinder head cover is provided on a cylinder head, and the variable valve device that is configured to change an opening and closing timing of a valve by the hydraulic pressure is mounted. The installation structure includes: a first slope that slopes upward and rearward from a front end on an upper surface of the cylinder head cover; and a second slope that slopes downward and rearward from a rear end of the first slope on the upper surface of the cylinder head cover. A radiator is installed in front of the cylinder head cover, and the oil control valve is installed on the second slope.

DESCRIPTION OF EMBODIMENTS

A variable valve device that changes an opening and closing timing of a valve by a hydraulic pressure is mounted on an engine according to one aspect of the present invention, and a hydraulic pressure to the variable valve device is controlled by an oil control valve. In an installation structure for an oil control valve, a first slope that slopes upward and rearward from a front end and a second slope that slopes downward and rearward from a rear end of the first slope are formed on an upper surface of a cylinder head cover provided on a cylinder head. A radiator is installed in front of the cylinder head cover, and the oil control valve is installed on the second slope. Thus, exhaust air from the radiator is directed obliquely upward toward the rear by the first slope of the cylinder head cover, making it difficult for the exhaust air to hit the oil control valve on the second slope. Therefore, a temperature rise of the oil control valve is suppressed, and operation accuracy and durability of the oil control valve are improved.

Embodiments

Figure 1:
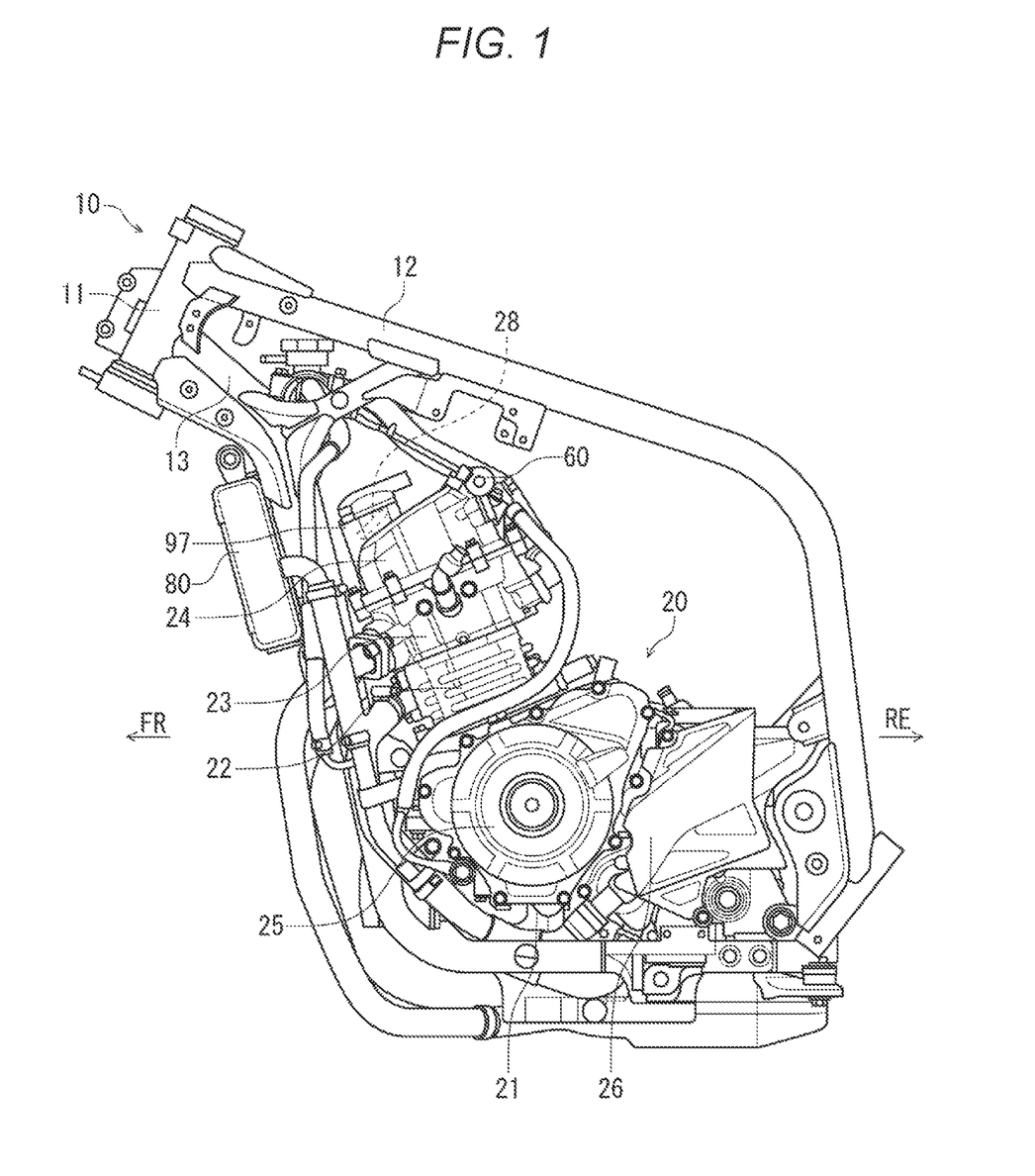
FIG. 1 is a left side view of an engine and a vehicle body frame according to the present embodiment.

Hereinafter, the present embodiment will be described in detail with reference to the accompanying drawings. FIG. 1 is a left side view of an engine and a vehicle body frame according to the present embodiment. In addition, in the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle includes various components such as an engine 20 and an electrical system mounted on a cradle type vehicle body frame 10. The vehicle body frame 10 includes a main tube 12 extending rearward from an upper portion of a head pipe 11 and then bent downward, and a down tube 13 extending downward from a lower portion of the head pipe 11 and then bent rearward. A rear end portion of the down tube 13 is bonded to a lower end portion of the main tube 12 to form an installation space for the engine 20 inside the vehicle body frame 10. The main tube 12 supports a rear side of the engine 20, and the down tube 13 supports a front side and a lower side of the engine 20.

The engine 20 is a parallel two-cylinder engine, and includes a crankcase 21, a cylinder 22 provided on the crankcase 21, a cylinder head 23 provided on the cylinder 22, and a cylinder head cover 24 provided on the cylinder head 23. A magneto cover 25 that covers a magneto (not shown) from the side is attached to a left side surface of the crankcase 21. A sprocket cover 26 that covers a drive sprocket (not shown) from the side is attached to a rear of the magneto cover 25. A clutch cover 27 (see FIG. 5) that covers a clutch (not shown) from the side is attached to a right side surface of the crankcase 21.

A valve operating chamber is formed inside the cylinder head 23 and the cylinder head cover 24. A variable valve device 30 (see FIG. 2) that changes an opening and closing timing (valve lift amount) of an intake valve 31 (see FIG. 2) and an exhaust valve 32 (see FIG. 2) by a hydraulic pressure is mounted in the valve operating chamber. An oil control valve 60 that controls a hydraulic pressure to the variable valve device 30 is installed on an outer surface of the cylinder head cover 24. The engine 20 is provided with a secondary air supply device that promotes combustion of unburned gas in exhaust, and a secondary air reed valve 28 that supplies secondary air to an exhaust system of the engine 20 and inhibits backflow of exhaust gas is installed.

A radiator 80 that dissipates heat from cooling water (refrigerant) for the engine 20 is installed in front of the engine 20. The cooling water warmed inside the engine 20 is sent out to the radiator 80, and heat is exchanged between the cooling water flowing through the radiator 80 and traveling wind passing through the radiator 80. A cooling fan 87 (see FIG. 4) that takes in hot air from the radiator 80 is attached to a rear surface of the radiator 80. When a temperature of the cooling water exceeds a predetermined temperature while the vehicle is stopped or traveling at a low speed, the cooling fan 87 is rotationally driven and the outside air is sent into the radiator 80, and the cooling water inside the radiator 80 is forcibly cooled.

In such a straddle-type vehicle, since the radiator 80 is installed in front of the cylinder head cover 24, when the oil control valve 60 is exposed to exhaust air from the radiator 80, operation accuracy and durability of the oil control valve 60 are lowered due to a temperature rise of the oil control valve 60. Therefore, in the present embodiment, the oil control valve 60 is installed behind the cylinder head cover 24. Further, an upper surface of the cylinder head cover 24 is inclined, and a valve case 97 of the secondary air reed valve 28 is formed on the upper surface of the cylinder head cover 24, so that flow of the exhaust air from the radiator 80 can be diverted from the oil control valve 60.

Figure 2:
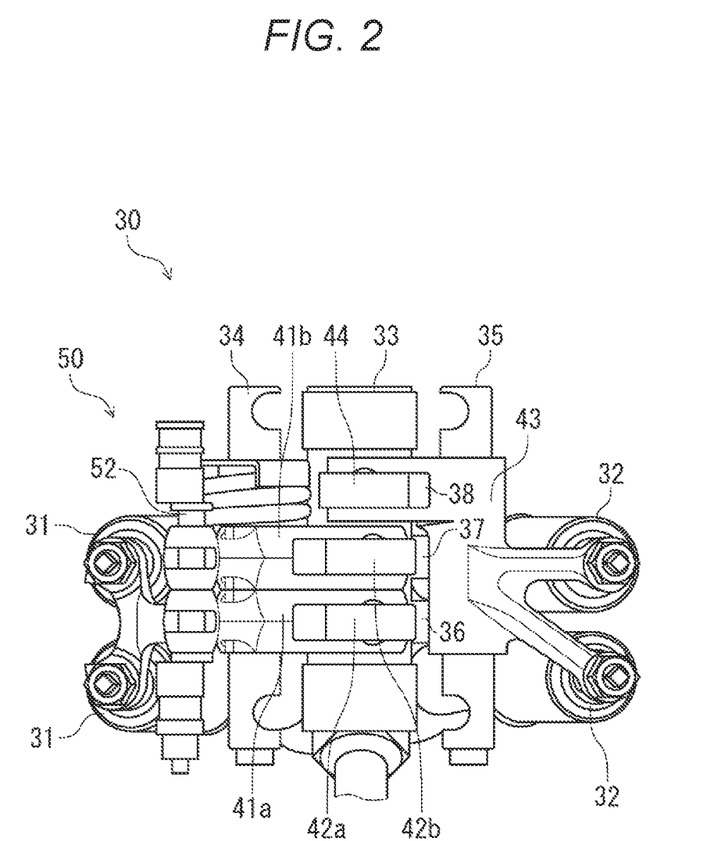
FIG. 2 is a schematic top view of a variable valve device according to the present embodiment.
Figure 3:
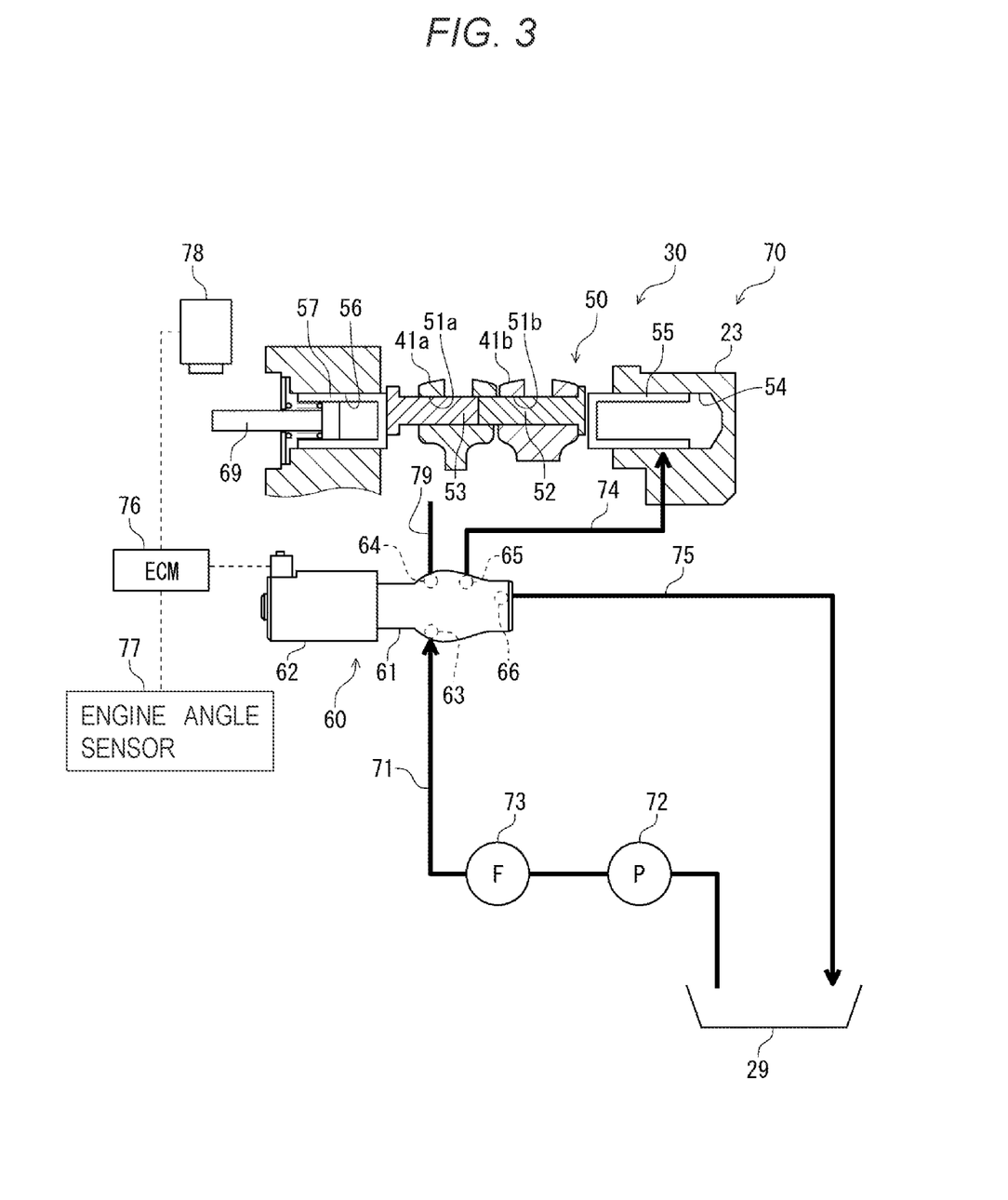
FIG. 3 is a schematic view of a variable valve system according to the present embodiment.

Here, the variable valve device according to the present embodiment will be described with reference to FIGS. 2 and 3. FIG. 2 is a schematic top view of the variable valve device according to the present embodiment. FIG. 3 is a schematic view of a variable valve system according to the present embodiment.

As shown in FIGS. 2 and 3, the cylinder head 23 is provided with four intake valves 31 each for opening and closing an intake port (not shown) and four exhaust valves 32 each for opening and closing an exhaust port (not shown) (only two of each are shown in FIG. 2). The variable valve device 30 is installed above the intake valve 31 and the exhaust valve 32. The variable valve device 30 is provided with a camshaft 33 common to an intake side and an exhaust side, and rocker shafts 34 and 35 on the intake side and the exhaust side parallel to the camshaft 33. A low-speed cam 36, a high-speed cam 37, and an exhaust cam 38 having different cam lobes are formed on an outer peripheral surface of the camshaft 33.

Two types of rocker arms 41a and 41b (only one of each is shown in FIG. 2) are swingably supported on the rocker shaft 34 on the intake side. A roller 42a in rolling contact with the low-speed cam 36 is rotatably supported at one end of the rocker arm 41a on the intake side, and a pair of intake valves 31 are connected to the other end of the rocker arm 41a which is bifurcated. On the other hand, a roller 42b in rolling contact with the high-speed cam 37 is rotatably supported at one end of the rocker arm 41b on the intake side, but the intake valve 31 is not connected to the other end of the rocker arm 41b. The rocker arms 41a and 41b are switched between a connected state and a non-connected state by a switching mechanism 50.

In the switching mechanism 50, a portion of a connecting pin 52 of the rocker arm 41b is pushed into a housing hole of the rocker arm 41a to connect the rocker arms 41a and 41b. In addition, in the switching mechanism 50, the portion of the connecting pin 52 is pushed back from the housing hole of the rocker arm 41a to release the connection between the rocker arms 41a and 41b. A pair of rocker arms 43 (only one is shown in FIG. 2) are swingably supported on the rocker shaft 35 on the exhaust side. A roller 44 in rolling contact with the exhaust cam 38 is rotatably supported at one end of the rocker arm 43 on the exhaust side, and a pair of exhaust valves 32 are connected to the other end of the rocker arm 43 which is bifurcated.

The rocker arms 41a and 41b are not connected when the engine 20 is rotated at a low speed and at a medium speed. Therefore, the rocker arm 41a is swung by the low-speed cam 36, and the rocker arm 41b is swung by the high-speed cam 37. Since the pair of intake valves 31 are connected to the rocker arm 41a, the pair of intake valves 31 are moved as the low-speed cam 36 rotates. The cam lobe of the low-speed cam 36 is low, and a valve lift amount of the pair of intake valves 31 is low. It should be noted that since the intake valve 31 is not connected to the rocker arm 41b, the rocker arm 41b is idling as the high-speed cam 37 rotates.

The rocker arms 41a and 41b are connected when the engine 20 is rotated at a high speed. Therefore, the rocker arms 41a and 41b are integrally swung by the high-speed cam 37. Since the pair of intake valves 31 are connected to the rocker arm 41b via the rocker arm 41a, the pair of intake valves 31 are moved as the high-speed cam 37 rotates. The cam lobe of the high-speed cam 37 is high, and a valve lift amount of the pair of intake valves 31 is high. Thus, in the variable valve device 30, the connected state of the rocker arms 41a and 41b is switched to switch the low-speed cam 36 and the high-speed cam 37 that move the intake valve 31.

As shown in FIG. 3, in a variable valve system 70, an oil supply passage 71 extends from an oil pan 29 toward the oil control valve 60. Oil is pumped up from the oil pan 29 by an oil pump 72 in the middle of the oil supply passage 71 and supplied to the oil control valve 60 through an oil filter 73. The oil control valve 60 includes a valve portion 61 that controls flow of the oil and a solenoid portion 62 that operates the valve portion 61. A valve spool (not shown) in the valve portion 61 is advanced and retracted by the solenoid portion 62 to switch an oil passage in the oil control valve 60.

An input port 63, a low speed port 64, a high speed port 65, and a drain port 66 are formed on the valve portion 61. The oil supply passage 71 communicates with the input port 63, a dead end passage 79 communicates with the low speed port 64, an operating passage 74 communicates with the high speed port 65, and a drain passage 75 communicates with the drain port 66. A discharge destination of the dead end passage 79 is blocked, and the operating passage 74 extends from the oil control valve 60 toward the switching mechanism 50. The drain passage 75 extends from the oil control valve 60 to above the oil pan 29, and drops the oil into the oil pan 29 from an outlet of the drain passage 75.

By moving a valve spool of the oil control valve 60, the input port 63 communicates with one of the low speed port 64 and the high speed port 65, and the drain port 66 communicates with the other one of the low speed port 64 and the high speed port 65. The oil is discharged from the oil control valve 60 to one of the dead end passage 79 and the operating passage 74, and excess oil is discharged to the oil control valve 60 (drain passage 75) from the other one of the dead end passage 79 and the operating passage 74. Thus, the oil control valve 60 controls a hydraulic pressure to the switching mechanism 50.

The rocker arms 41a and 41b are adjacent to each other, but upper portions of the rocker arms 41a and 41b face each other with a small gap therebetween. Housing holes 51a and 51b parallel to the camshaft 33 are respectively formed in the upper portions of the rocker arms 41a and 41b. Hole diameters of the housing hole 51a in the rocker arm 41a and the housing hole 51b in the rocker arm 41b match with each other, and the housing holes 51a and 51b are coaxially formed so as to communicate with each other in a state of not being lifted up. The connecting pin 52 is installed in the housing hole 51b in the rocker arm 41b, and a return pin 53 is installed in the housing hole 51a in the rocker arm 41a.

A sliding chamber 54 is formed on one side of the cylinder head 23 with respect to the rocker arm 41b, and a hydraulic piston 55 is installed in the sliding chamber 54. A pressing surface of the hydraulic piston 55 is in contact with the connecting pin 52, and the connecting pin 52 is moved to the other side by the hydraulic piston 55. In addition, a sliding chamber 56 is formed on the other side of the cylinder head 23 with respect to the rocker arm 41a. A spring pin 57 is installed in the sliding chamber 56. A pressing surface of the spring pin 57 is in contact with the return pin 53, and the return pin 53 is moved to one side by the spring pin 57. A sensing arm 69 extends from the spring pin 57 to the other side.

In the switching mechanism 50, the connected state of the rocker arms 41a and 41b is switched by moving the connecting pin 52 by a hydraulic pressure. The pair of intake valves 31 are operated by the low-speed cam 36 via the rocker arm 41a in the non-connected state of the rocker arms 41a and 41b. The pair of intake valves 31 are operated by the high-speed cam 37 via the rocker arms 41a and 41b in the connected state of the rocker arms 41a and 41b. Thus, in the switching mechanism 50, the connected state of the rocker arms 41a and 41b is switched by the connecting pin 52, thereby switching the cams that move the pair of intake valves 31.

In addition, the variable valve device 30 is provided with an engine control module (ECM) 76, an engine angle sensor 77, and a switching sensor 78. An engine speed is detected by the engine angle sensor 77, and a connection command signal is output from the ECM 76 to the solenoid portion 62 when the engine speed is equal to or more than a predetermined speed and a release command signal is output from the ECM 76 to the solenoid portion 62 when the engine speed falls below the predetermined speed. The switching sensor 78 detects switching between the connected state and the non-connected state of the rocker arms 41a and 41b based on a movement of a tip of the sensing arm 69. A failure of the variable valve device 30 such as a defective switching operation can be determined by comparing a command signal from the ECM 76 and a detection signal from the switching sensor 78.

Figure 4:
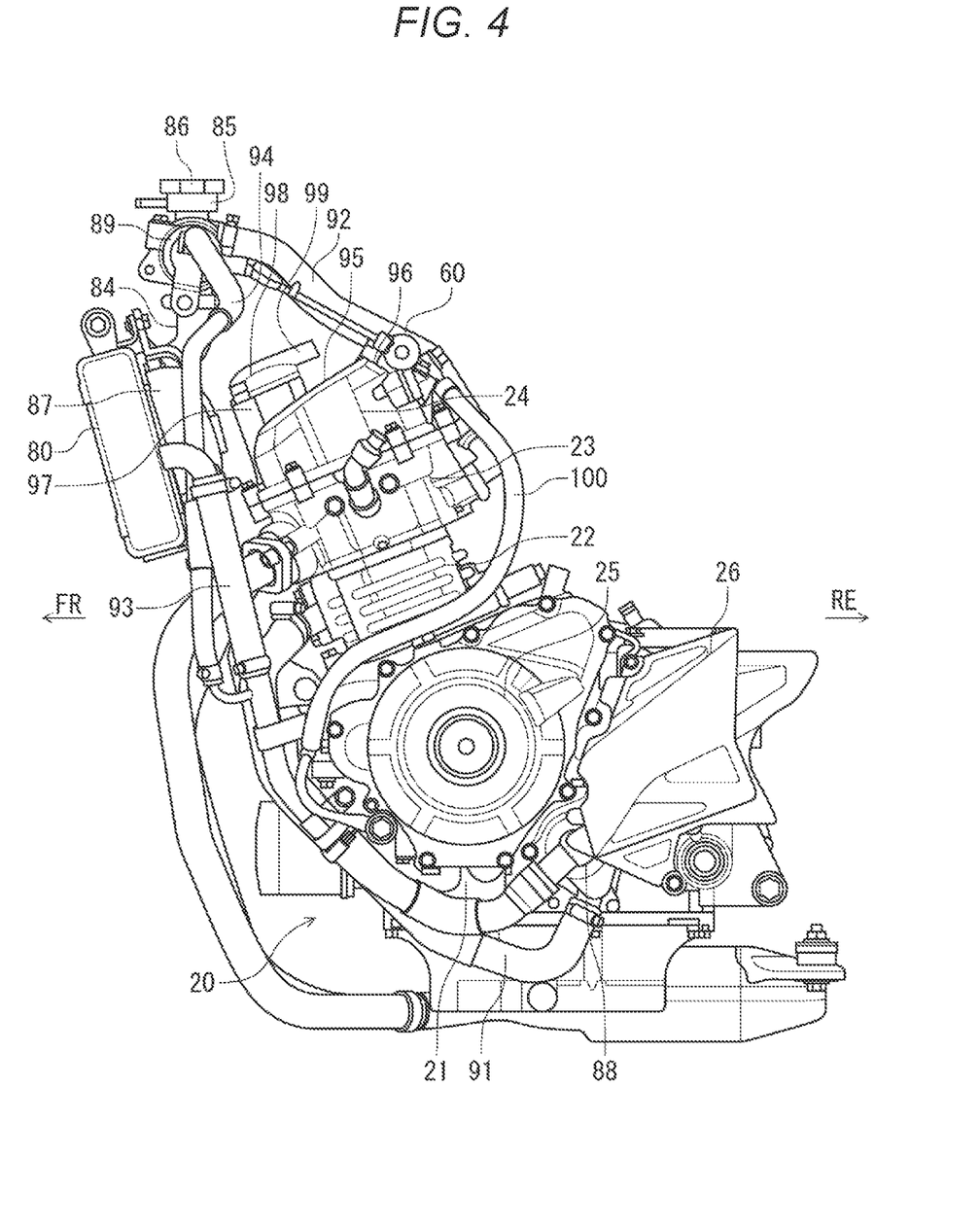
FIG. 4 is a left side view of the engine according to the present embodiment.
Figure 5:
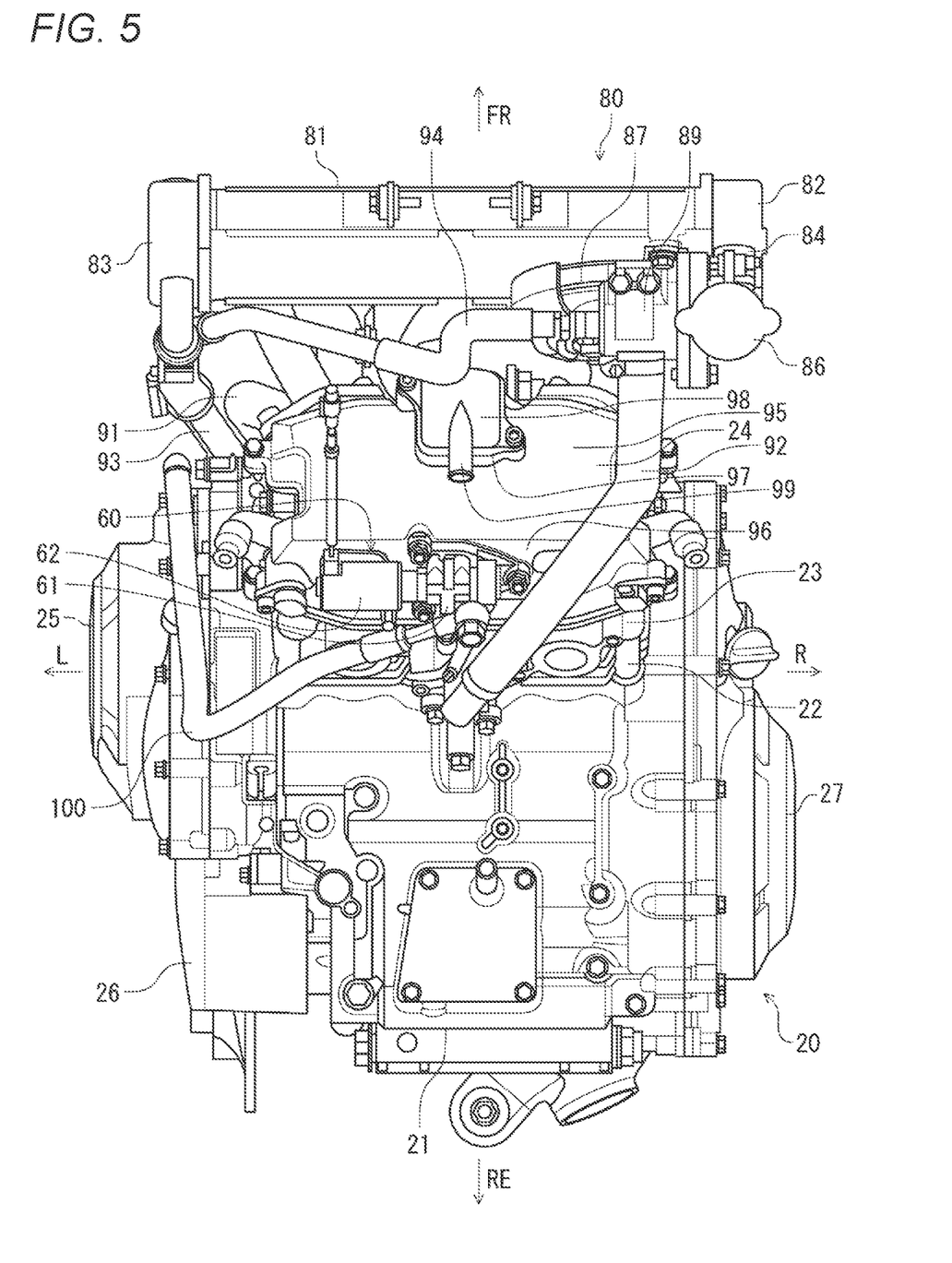
FIG. 5 is a top view of the engine according to the present embodiment.

A cooling structure of the engine and the installation structure for an oil control valve will be described with reference to FIGS. 4 and 5. FIG. 4 is a left side view of the engine according to the present embodiment. FIG. 5 is a top view of the engine according to the present embodiment.

As shown in FIGS. 4 and 5, the radiator 80 is provided in front of the cylinder head cover 24. The radiator 80 includes a radiator core 81 that exchanges heat by a large number of thin tubes or heat radiating fins, an inflow tank 82 that causes the cooling water to flow in from a right side of the radiator core 81, and an outflow tank 83 that causes the cooling water to flow out from a left side of the radiator core 81. A water supply port 85 is connected to the inflow tank 82 via a water supply pipe 84, and a radiator cap 86 is attached to the water supply port 85. The cooling fan 87 that guides outside air toward the radiator core 81 when the vehicle is stopped is provided on a back side of the radiator core 81.

As described above, the magneto cover 25 and the sprocket cover 26 are provided on a left side surface of the engine 20, and a water pump 88 is attached to a lower side of the magneto cover 25 and the sprocket cover 26. A discharge port of the water pump 88 is connected to a water jacket inside the cylinder 22 through a first outlet pipe 91, and a water jacket inside the cylinder head 23 is connected to a thermostat case 89 through a second outlet pipe 92. The thermostat case 89 is provided at the water supply port 85, and a thermostat (not shown) that controls flow of the cooling water to the inflow tank 82 is housed in the thermostat case 89.

The outflow tank 83 is connected to an inflow port of the water pump 88 through an inlet pipe 93. A bypass pipe 94 that bypasses the radiator 80 and is directed to the inlet pipe 93 is connected to the thermostat case 89. When a temperature of the cooling water is lower than a predetermined temperature, the thermostat is closed to block the flow of the cooling water from the engine 20 toward the radiator 80, and the cooling water is returned to the water pump 88 by bypassing the radiator 80 through the bypass pipe 94. When the temperature of the cooling water rises to a predetermined temperature or more, the thermostat is opened and the cooling water flows from the engine 20 to the radiator 80 to effectively cool the engine 20.

The radiator 80 is installed in front of the cylinder head cover 24, and the oil control valve 60 is installed on a rear side of the upper surface of the cylinder head cover 24. A first slope 95 that slopes upward and rearward from a front end and a second slope 96 that slopes downward and rearward from a rear end of the first slope 95 are formed on the upper surface of the cylinder head cover 24. The switching mechanism 50 (see FIG. 3) is provided on the intake side in the cylinder head cover 24, and the first slope 95 that is an uphill whose front side is gentle and the second slope 96 that is a downhill whose rear side is steep are formed with an upper region of the switching mechanism 50 as a boundary.

The oil control valve 60 is installed on the second slope 96 of the cylinder head cover 24 with a central axis of the oil control valve 60 oriented in a vehicle width direction. A windbreak is formed on the upper surface of the cylinder head cover 24 by the first slope 95 and the second slope 96, and the exhaust air from the radiator 80 is diverted obliquely upward toward the rear, making it difficult for the exhaust air to flow toward the oil control valve 60. A portion of the oil control valve 60 protrudes upward with respect to a top of the cylinder head cover 24 (a vertex between the first slope 95 and the second slope 96), and the oil control valve 60 is located at substantially the same height as an upper end of the radiator 80.

The valve case 97 of the secondary air reed valve 28 (see FIG. 1) bulges upward from the first slope 95 of the cylinder head cover 24. A valve cover 98 is attached on the valve case 97 and is located at substantially the same height as the oil control valve 60. A nipple 99 is formed on the valve cover 98, and is located at the uppermost level. The valve case 97 is positioned at a center of the cylinder head cover 24 in the vehicle width direction, and a portion of the valve cover 98 overlaps with the oil control valve 60 in a front-rear direction. The exhaust air from the radiator 80 is blocked by the valve cover 98, making it difficult for the exhaust air to flow toward the oil control valve 60.

A plurality of cylinders are formed in the engine 20, and the oil control valve 60 is attached to the center of the cylinder head cover 24 in the vehicle width direction between adjacent cylinders. Since even when the exhaust air from the radiator 80 flows around the cylinder head cover 24 from the side, the oil control valve 60 is positioned at a center in the vehicle width direction, it is difficult for the exhaust air from the radiator 80 to hit the oil control valve 60. In addition, a length of a hydraulic pressure path from the oil control valve 60 to the variable valve device 30 (see FIG. 2) of each cylinder is made uniform and a fluctuation in hydraulic pressure to the variable valve device 30 of each cylinder is eliminated, and thus, operation accuracy of the variable valve device 30 can be improved.

As described above, the cooling fan 87 is provided on the rear surface of the radiator 80, and the cooling fan 87 is operated when a temperature of the cooling water in the radiator 80 is increased. Therefore, in the oil control valve 60, in order to make it difficult for high-temperature exhaust air from the cooling fan 87 to hit the solenoid portion 62, which is particularly sensitive to heat, the cooling fan 87 and the solenoid portion 62 are installed separately to the left and right. In the present embodiment, the cooling fan 87 is brought to one side (right side) of the rear surface of the radiator 80 in the vehicle width direction, and the solenoid portion 62 of the oil control valve 60 is located on the other side (left side) of the cylinder head cover 24 in the vehicle width direction.

The oil is supplied to the oil control valve 60 from the crankcase 21 through an oil pipe 100. One end of the oil pipe 100 is connected to a main gallery (not shown) at a front portion of the crankcase 21, and the other end of the oil pipe 100 is connected to the input port 63 (see FIG. 3) at a lower portion of the oil control valve 60. The oil pipe 100 extends downward from the oil control valve 60, passes through, in a front-rear direction, an outside of the cylinder head 23 in the vehicle width direction below the radiator 80, and reaches the crankcase 21 so as to bypass a front side of the magneto cover 25. Thus, the oil pipe 100 is disposed so as to avoid the radiator 80 when viewed from the side.

In addition, when viewed from above, the oil pipe 100 extends from the oil control valve 60 to the other side (left side) in the vehicle width direction, and the oil pipe 100 is disposed so as to avoid a rear of the cooling fan 87 on the one side (right side) in the vehicle width direction. It is difficult for the exhaust air from the radiator 80 and the cooling fan 87 to hit the oil pipe 100, and a temperature rise of the oil in the oil pipe 100 is suppressed. In addition, by stabilizing the temperature of the oil, operation characteristics of the oil control valve 60 are stabilized. The oil is directly supplied to the oil control valve 60 from the main gallery of the crankcase 21 through the oil pipe 100, and thus pressure loss is minimized.

Figure 6:
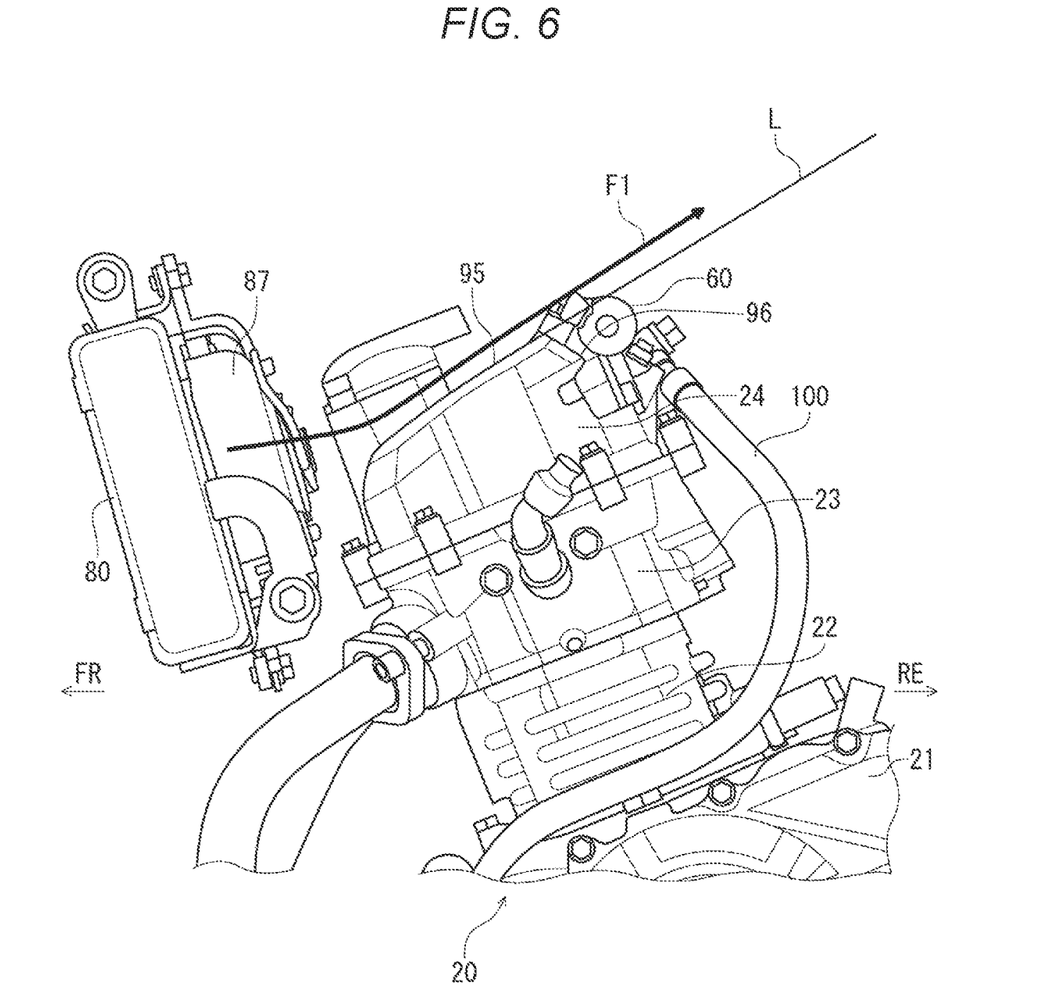
FIG. 6 is a side view showing flow of exhaust air from a radiator according to the present embodiment.
Figure 7:
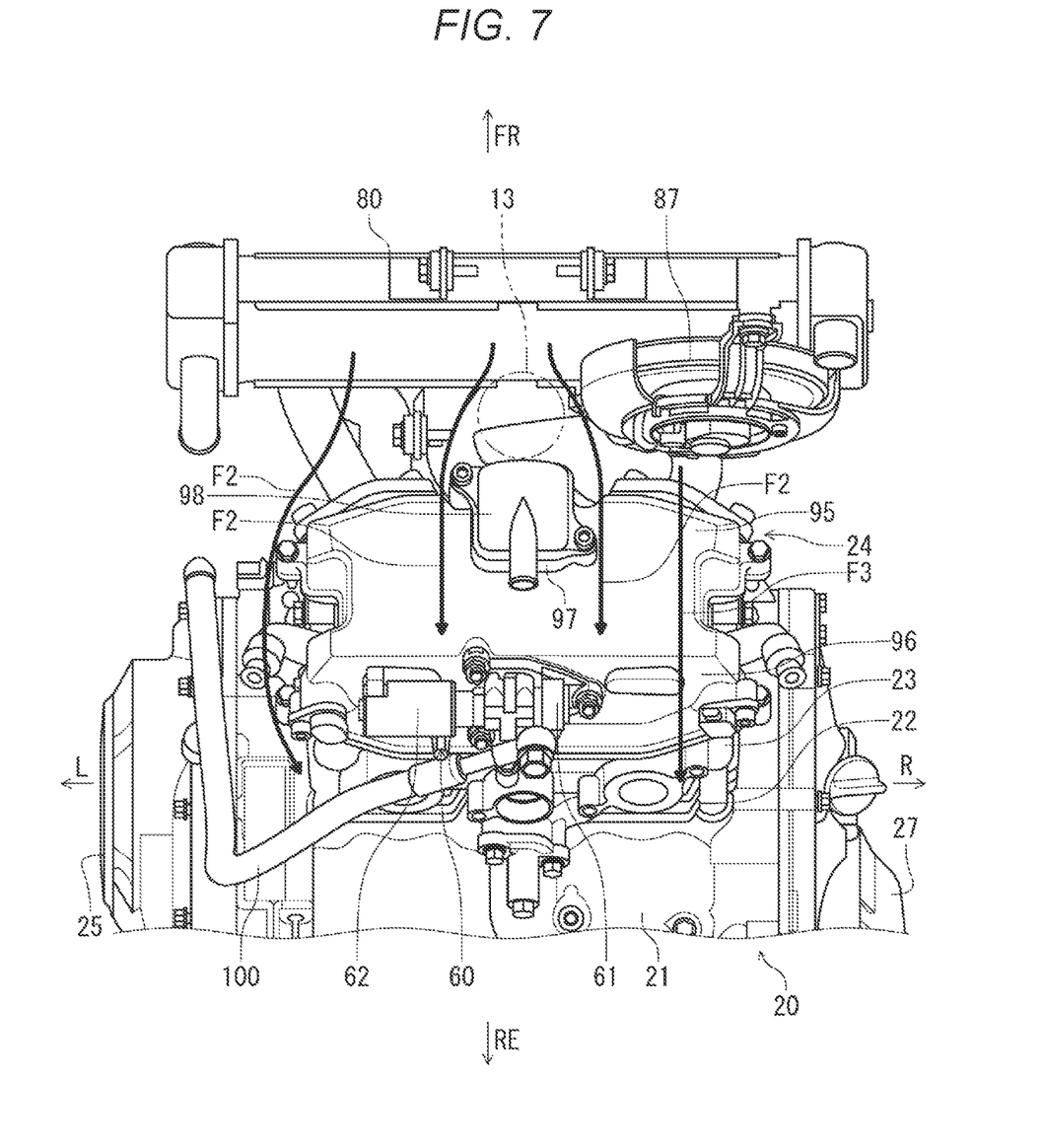
FIG. 7 is a top view showing the flow of the exhaust air from the radiator according to the present embodiment.

Flow of the exhaust air from the radiator will be described with reference to FIGS. 6 and 7. FIG. 6 is a side view showing the flow of the exhaust air from the radiator according to the present embodiment. FIG. 7 is a top view showing the flow of the exhaust air from the radiator according to the present embodiment.

As shown in FIG. 6, the cylinder head cover 24 is located at a rear of the radiator 80 and exhaust air F1 from the radiator 80 is blown against the cylinder head cover 24. The upper surface of the cylinder head cover 24 is formed in a mountain-like shape when viewed from the side by the first slope 95 and the second slope 96, and when the exhaust air F1 is blown against the first slope 95, the exhaust air F1 is caused to flow obliquely upward toward the rear along the first slope 95. The oil control valve 60 is installed on the second slope 96, and although the oil control valve 60 protrudes upward from a vertex of the cylinder head cover 24, it is difficult for the exhaust air F1 to hit the oil control valve 60.

More specifically, most of the oil control valve 60 is hidden behind the cylinder head cover 24 when viewed from a direction of flow of the exhaust air F1 from the radiator 80. Most of the oil control valve 60 is located below an extension line L of the first slope 95. Therefore, most of the exhaust air F1 flows backward without hitting the oil control valve 60, thereby suppressing the temperature rise of the oil control valve 60 due to the exhaust air F1, and improving the operation accuracy and the durability of the oil control valve 60. It should be noted that the entire oil control valve 60 may be located below the extension line L of the first slope 95.

As shown in FIG. 7, the valve case 97 bulges from the first slope 95 and the valve cover 98 is attached on the valve case 97. The cylinder head 23 is suspended on the vehicle body frame 10 (see FIG. 1), and the down tube 13 of the vehicle body frame 10 extends downward through between the radiator 80 and the engine 20. The valve cover 98 and the down tube 13 are positioned at the center in the vehicle width direction, and the valve portion 61 of the oil control valve 60 is also positioned at the center in the vehicle width direction. The valve cover 98 and the down tube 13 overlap with the valve portion 61 of the oil control valve 60 in the front-rear direction.

More specifically, the down tube 13, the valve cover 98, and the valve portion 61 of the oil control valve 60 are linearly arranged in this order from the front when viewed from above. Exhaust air F2 from the radiator 80 is blocked by the down tube 13 and the valve cover 98, making it difficult for the exhaust air F2 to flow toward the oil control valve 60, thereby suppressing the temperature rise of the oil control valve 60. Since although a part of the exhaust air F2 from the radiator 80 flows around the cylinder head cover 24 from the side, the valve portion 61 of the oil control valve 60 is positioned at the center in the vehicle width direction, it is difficult for the exhaust air F2 to hit the valve portion 61.

The solenoid portion 62 of the oil control valve 60 is positioned on an opposite side of the cooling fan 87 with the down tube 13 interposed therebetween in the vehicle width direction. Therefore, even when a temperature of the radiator 80 becomes high and the cooling fan 87 is operated, the solenoid portion 62 is deviated from a flow direction of high-temperature exhaust air F3 from the cooling fan 87, thereby suppressing a temperature rise of the solenoid portion 62, which is sensitive to a high temperature. Similarly, the oil pipe 100 of the oil control valve 60 is also positioned on the opposite side of the cooling fan 87 with the down tube 13 interposed therebetween in the vehicle width direction, and the oil pipe 100 is deviated from the flow direction of the high-temperature exhaust air F3 from the cooling fan 87, thereby suppressing a temperature rise of the oil pipe 100.

As described above, according to the present embodiment, the exhaust air from the radiator 80 is directed obliquely upward toward the rear by the first slope 95 of the cylinder head cover 24, making it difficult for the exhaust air to hit the oil control valve 60 on the second slope 96. Therefore, the temperature rise of the oil control valve 60 is suppressed, and the operation accuracy and the durability of the oil control valve 60 are improved.

It should be noted that although a valve case of the secondary air reed valve is formed on the cylinder head cover in the present embodiment, the valve case of the secondary air reed valve may not be formed on the cylinder head cover. That is, the engine is not limited to one provided with the secondary air supply device.

In addition, although the parallel two-cylinder engine is exemplified as the engine in the present embodiment, a type of the engine is not particularly limited.

In addition, although a cradle frame is exemplified as the vehicle body frame in the present embodiment, a type of the vehicle body frame is not particularly limited as long as the vehicle body frame can suspend the cylinder head. For example, the vehicle body frame may be a twin spar frame or a diamond frame.

In addition, although a solenoid valve is exemplified as the oil control valve in the present embodiment, a type of the oil control valve is not particularly limited as long as the oil control valve is a valve capable of controlling the hydraulic pressure to the variable valve device.

In addition, although the oil control valve and the main gallery are connected by an oil pipe passing through an outside of the engine in the present embodiment, the oil control valve and the main gallery may be connected by an oil passage inside the engine.

In addition, although a central axis of the oil control valve is oriented in the vehicle width direction in the present embodiment, the orientation of the central axis of the oil control valve is not particularly limited. The central axis of the oil control valve may be oriented in the front-rear direction.

In addition, the installation structure for an oil control valve may be applied not only to the illustrated straddle-type vehicle, and but also to other types of straddle-type vehicles. The straddle-type vehicle is not limited to general vehicles on which a rider rides in a posture of straddling a seat, and also includes small-sized scooter-type vehicles on which a rider rides without straddling a seat.

As described above, a first aspect is an installation structure for an oil control valve (60) configured to control a hydraulic pressure to a variable valve device, in an engine (20) in which a cylinder head cover (24) is provided on a cylinder head (23), and the variable valve device (30) that is configured to change an opening and closing timing of a valve (intake valve 31, exhaust valve 32) by a hydraulic pressure is mounted. The installation structure includes: a first slope (95) that slopes upward and rearward from a front end on an upper surface of the cylinder head cover; and a second slope (96) that slopes downward and rearward from a rear end of the first slope on the upper surface of the cylinder head cover. A radiator (80) is installed in front of the cylinder head cover, and the oil control valve is installed on the second slope. According to this configuration, an exhaust air from the radiator is directed obliquely upward toward the rear by the first slope of the cylinder head cover, making it difficult for the exhaust air to hit the oil control valve on the second slope. Therefore, a temperature rise of the oil control valve is suppressed, and operation accuracy and durability of the oil control valve are improved.

A second aspect is the structure in which a valve case (97) of a secondary air reed valve (28) that is configured to supply secondary air to an exhaust system of the engine bulges upward from the first slope, and a valve cover (98) is attached to the valve case, and a portion of the valve cover overlaps with the oil control valve in a front-rear direction, in addition to the first aspect. According to this configuration, the exhaust air from the radiator is blocked by the valve cover of the secondary air reed valve, and the temperature rise of the oil control valve is suppressed.

A third aspect is the structure in which the cylinder head is suspended on a vehicle body frame (10), and the vehicle body frame includes a down tube (13) extending downward from a head pipe (11) through between the radiator and the engine, and the down tube overlaps with the oil control valve in a front-rear direction, in addition to the first aspect or the second aspect. According to this configuration, the exhaust air from the radiator is blocked by the down tube, and the temperature rise of the oil control valve is suppressed.

A fourth aspect is the structure in which the engine includes a plurality of cylinders, and the oil control valve is positioned at a center of the cylinder head cover in a vehicle width direction between adjacent cylinders, in addition to any one aspect of the first aspect to the third aspect. According to this configuration, even when the exhaust air from the radiator flows around the cylinder head cover from the side, it is difficult for the exhaust air to hit the oil control valve at the center in the vehicle width direction, and the temperature rise of the oil control valve is suppressed. In addition, it is possible to uniformly apply a hydraulic pressure to the variable valve device of each cylinder, thereby improving operation accuracy of the variable valve device of each cylinder.

A fifth aspect is the structure in which a cooling fan (87) is provided on a rear surface of the radiator, the oil control valve includes a valve portion (61) that is configured to control flow of oil and a solenoid portion (62) that is configured to operate the valve portion, and the cooling fan is positioned on one side in a vehicle width direction, and the solenoid portion is positioned on the other side in the vehicle width direction, in addition to any one aspect of the first aspect to the fourth aspect. According to this configuration, since the cooling fan is operated when a temperature of a refrigerant in the radiator is high, a temperature of the exhaust air from the cooling fan becomes high, but it is difficult for the exhaust air to hit the solenoid portion, which is particularly sensitive to heat, and a temperature rise of the solenoid portion is suppressed.

A sixth aspect is the structure in which oil is to be supplied to the oil control valve from a crankcase (21) of the engine through an oil pipe (100), and one end of the oil pipe is connected to a front portion of the crankcase, the other end of the oil pipe is connected to a lower portion of the oil control valve, and the oil pipe extends in a front-rear direction below the radiator through an outside of the cylinder head in a vehicle width direction, in addition to any one aspect of the first aspect to the fifth aspect. According to this configuration, it is difficult for the exhaust air from the radiator to hit the oil pipe, and a temperature rise of the oil in the oil pipe is suppressed. By stabilizing the temperature of the oil, operation characteristics of the oil control valve can be stabilized.

It should be noted that although the present embodiment has been described, the above-described embodiment and modification may be combined entirely or partially as another embodiment.

In addition, the technique of the present invention is not limited to the above-described embodiment, and various changes, substitutions, and modifications may be made without departing from the spirit of the technical concept of the present invention. Further, the present invention may be implemented by other methods as long as the technical concept can be implemented by the methods through advance of the technique or other derivative techniques. Therefore, the scope of the claims covers all embodiments that may be included within the scope of the technical concept.

What is claimed is:

1. An installation structure for an oil control valve configured to control a hydraulic pressure to a variable valve device which adjusts an opening and closing timing of a valve, in an engine including a cylinder head cover provided on a cylinder head, and a radiator installed in front of the cylinder head cover, the installation structure comprising:
   a first slope that slopes upward and rearward from a front end on an upper surface of the cylinder head cover; and
   a second slope that slopes downward and rearward from a rear end of the first slope on the upper surface of the cylinder head cover,
   wherein the oil control valve is installed on the second slope of the cylinder head cover such that a central axis of the oil control valve extends in a vehicle width direction.

2. The installation structure for the oil control valve according to claim 1, wherein:
   a valve case of a secondary air reed valve configured to supply secondary air to an exhaust system of the engine bulges upward from the first slope, and a valve cover is attached to the valve case, and
   a portion of the valve cover overlaps with the oil control valve in a vehicle front-rear direction.

3. The installation structure for the oil control valve according to claim 1, wherein:
   the cylinder head is suspended on a vehicle body frame, and
   the vehicle body frame includes a down tube extending downward from a head pipe through a space between the radiator and the engine, the down tube overlapping with the oil control valve in a front-rear direction.

4. The installation structure for the oil control valve according to claim 1, wherein;
   the engine includes a plurality of cylinders, and
   the oil control valve is positioned at a center of the cylinder head cover in the vehicle width direction between adjacent cylinders.

5. The installation structure for the oil control valve according to claim 1, wherein:
   a cooling fan is provided on a rear surface of the radiator, the oil control valve includes a valve portion configured to control flow of oil, and a solenoid portion configured to operate the valve portion, and
   the cooling fan is positioned on a first side in the vehicle width direction, and the solenoid portion is positioned on a second side in the vehicle width direction.

6. The installation structure for the oil control valve according to claim 1, wherein:
   oil is supplied to the oil control valve from a crankcase of the engine via an oil pipe, and
   a first end of the oil pipe is connected to a front portion of the crankcase, a second end of the oil pipe is connected to a lower portion of the oil control valve, and the oil pipe extends in a vehicle front-rear direction below the radiator through an outside of the cylinder head in a vehicle width direction.

7. The installation structure for the oil control valve according to claim 1, wherein the oil control valve is located at a height equal to a height of an upper end of the radiator.

8. An installation structure for an oil control valve configured to control a hydraulic pressure to a variable valve device which adjusts an opening and closing timing of a valve, in an engine including a cylinder head cover provided on a cylinder head, and a radiator installed in front of the cylinder head cover, the installation structure comprising:
   a first slope that slopes upward and rearward from a front end on an upper surface of the cylinder head cover; and
   a second slope that slopes downward and rearward from a rear end of the first slope on the upper surface of the cylinder head cover,
   wherein:
      the oil control valve is installed on the second slope of the cylinder head cover, oil is supplied to the oil control valve from a crankcase of the engine via an oil pipe, and
      a first end of the oil pipe is connected to a front portion of the crankcase, a second end of the oil pipe is connected to a lower portion of the oil control valve, and the oil pipe extends in a vehicle front-rear direction below the radiator through an outside of the cylinder head in a vehicle width direction.

* * * * *